Figure 1:
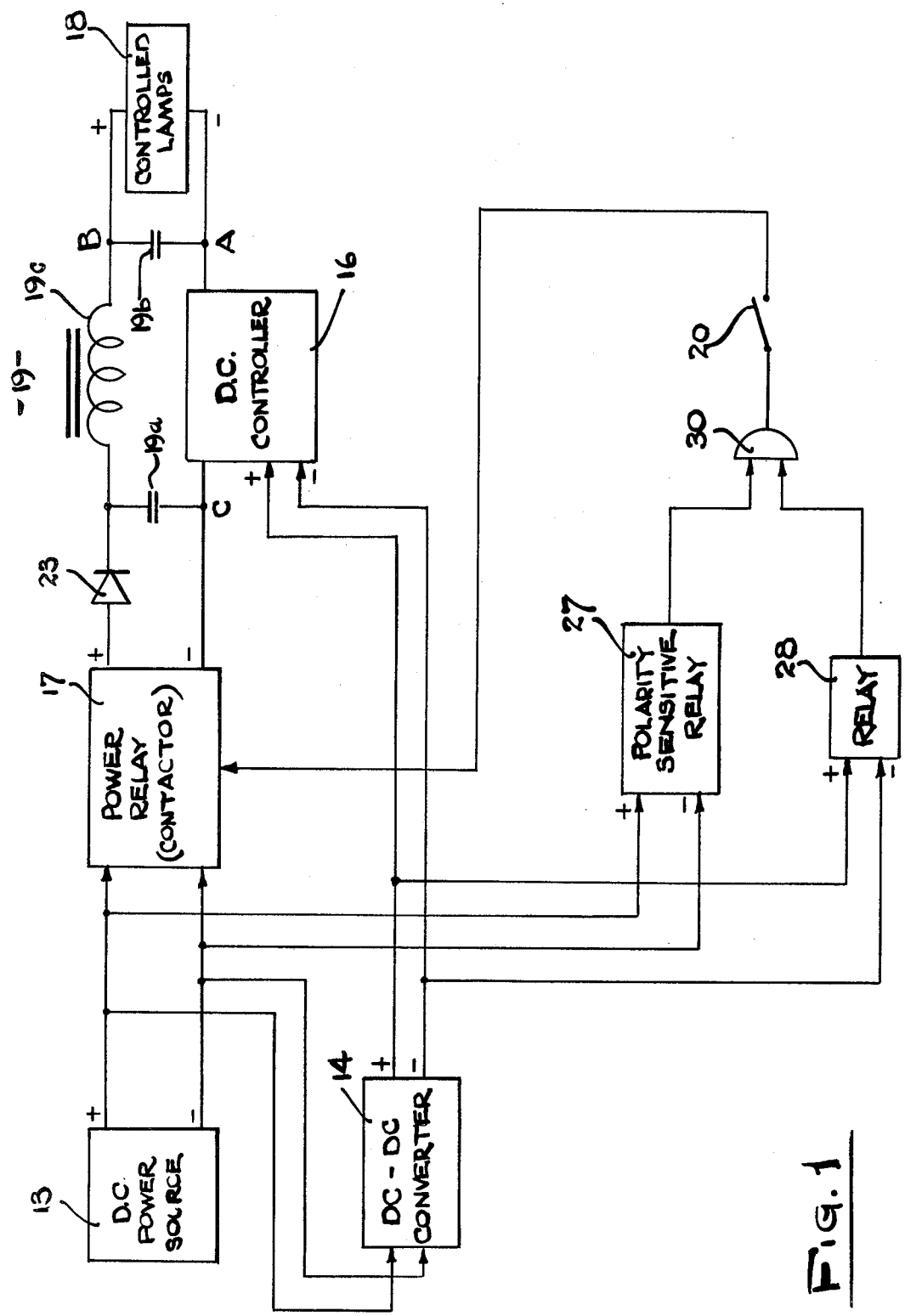

United States Patent [19]

Krokaugger

[11] 4,450,384
[45] May 22, 1984

[54] DC LIGHT DIMMER CONTROL SYSTEM

[75] Inventor: William G. Krokaugger, Chatsworth, Calif.

[73] Assignee: Mole-Richardson Company, Hollywood, Calif.

[21] Appl. No.: 405,278

[22] Filed: Aug. 4, 1982

[51] Int. Cl.³ .......................................... H05B 37/02
[52] U.S. Cl. .................... 315/127; 315/225; 315/291; 315/308; 361/84
[58] Field of Search .............. 315/119, 127, 129, 225, 315/291, 311, 308; 361/18, 78, 79, 82, 84; 328/8; 363/50, 53

[56] References Cited

U.S. PATENT DOCUMENTS 3,320,477 5/1967 Boeker ............................ 315/308 X
3,719,858 3/1973 Gilbreath ........................ 315/308 X Primary Examiner—LaRoche Eugene R.
Attorney, Agent, or Firm—Edward A. Sokolski

[57] ABSTRACT

A light dimmer control system for controlling the current supplied from a DC power source to high power illuminating lamps. The current fed to the lamp is controlled by manually setting the width of the pulsed output of a pulse width modulator by means of a potentiometer or the like appropriately connected to the pulse width modulator. The output of the pulse width modulator drives an output driver circuit which is connected in series with the current path to the lamp. The lamp power is provided from a DC source which is controlled by the output driver circuit in series with the lamp. The power for the semiconductor components of the DC controller, which includes the pulse width modulator, is provided from the same DC source and stepped down by a DC-DC converter. A logical control circuit is employed which enables the energization of the system only when both the polarity of the DC input supply is correct and the low voltage DC is on, thereby minimizing the possibility of damaging system components.

5 Claims, 2 Drawing Figures

DC LIGHT DIMMER CONTROL SYSTEM

This invention relates to dimmer control systems for electric lamps, and more particularly to such a system employing a DC supply for the lamps, the output of which is controlled by a DC controller.

In lighting systems employed in motion picture, television and theater work, high power lamps are generally employed, the intensity of the illumination of such lamps being controlled by means of dimmer devices. Where the illumination equipment is located on sound stages or other locations, where sensitive microphones are employed, it has been found necessary to use DC current for the high power lighting systems in view of the audio interference caused by high power AC. In such situations, the intensity of the lighting is controlled by means of variable resistance type controls, such as rheostats and the like. In view of the high power involved, such resistive-type controls involve the dissipation of substantial energy in the form of heat with the obvious undesirable end results. Further, such resistive type controls tend to be rather large and bulky in view of the high level current to be controlled.

The system of the present invention obviates the aforementioned shortcomings of the prior art by employing a semiconductor type dimmer control in which the dissipation of power and generation of heat is minimized. Further, the device of the present invention is amenable to compact construction avoiding the rather large and bulky resistive type controls of the prior art.

It is therefore an object of this invention to provide an improved direct current high power dimmer system wherein power and heat dissipation is minimized.

It is a further object of this invention to provide a high power DC dimmer control system of more compact proportions than such devices of the prior art.

Figure 2:
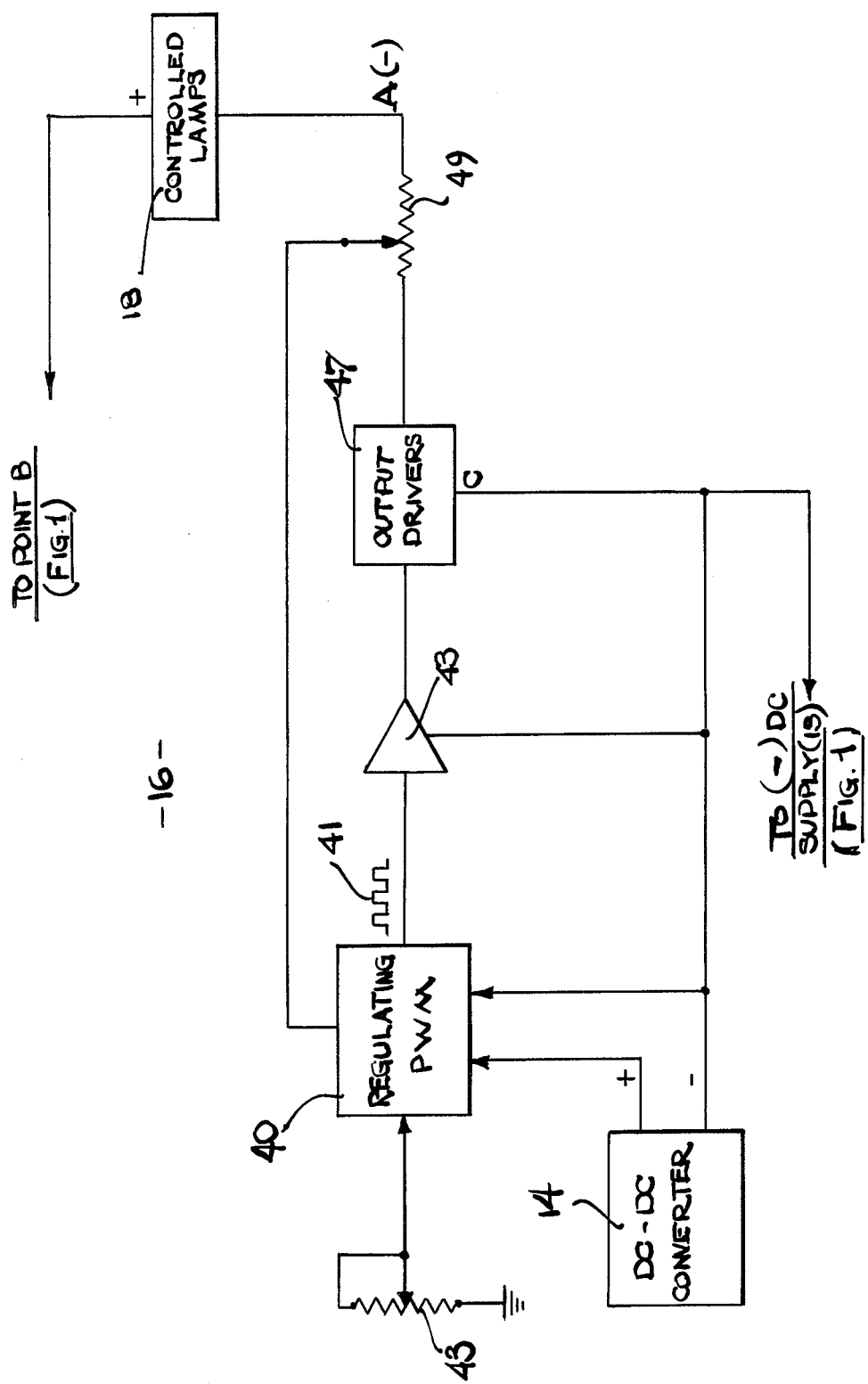

Other objects of the invention will become apparent as the description proceeds in connection with the accompanying drawings of which:

FIG. 1 is a functional block diagram of a preferred embodiment of the invention; and FIG. 2 is a functional block diagram of the DC controller of the preferred embodiment.

Briefly described, the system of the invention operates from a DC power source and employs a DC-DC (DC to DC) converter (DC supply) which provides an output voltage of the order of 12 volts. The DC source is connected through a DC controller to a lamp, the illumination of which is to be controlled. The DC controller employs semiconductor devices, the low voltage (12-volt) DC supply providing the operating voltages for such device. The DC controller includes a regulating pulse width modulator. The pulse width of the modulator is controlled by means of a manual control, such as a potentiometer, this pulse width output being used to drive high current output drivers. The drivers are connected in the current path between the DC source and the illuminating lamps such as to control the current supplied to the lamps in response to the pulse width modulator output.

To avoid damage to the components of the system, a logical control circuit employed which permits the energization of the power relay or contactor which connects the DC power to the load only when both the DC power is connected to the load with the right polarity and the 12 volts is being supplied to the system, thereby avoiding damage to system components.

Referring now to FIG. 1, a functional block diagram of a preferred embodiment of the system is shown. The main DC power and low voltage DC-DC converter 14 both are supplied from DC power source 13 which may comprise a motor generator providing an output of the order of 120 V DC. The DC output of DC-DC converter 14 is fed to DC controller 16 which, as to be described more fully in connection with FIG. 2, includes semiconductor control devices which are adapted to control the current supplied to the controlled lamps 18 so as to vary the illumination thereof as may be desired. The DC source 13 is connected through power relay or contactor 17 to ripple filter 19 when ON/OFF switch 20 is closed. Ripple filter 19 includes a pair of filter capacitors 19a and 19b and a filter choke 19c connected therebetween. The negative terminal of power relay 17 is connected to the lamps 18 through DC controller 16, the current to the lamps being controlled by the controller, as to be described in connection with FIG. 2.

A protective diode 23 is placed between the positive terminal of power relay 17 and filter 19 to prevent any residual charge on capacitor 19a from discharging back through the power relay, which might cause damage thereto.

Protection for system components is provided by means of a logical protective circuit which includes relays 27 and 28 and the AND gate 30. Polarity sensitive relay 27 receives the voltage output of DC source 13 and is only actuated when the polarity of this voltage is correct. When relay 27 is actuated, an actuation signal is fed to AND gate 30. The DC output of DC-DC converter 14 is connected to the relay coil and in turn provides an actuation to AND gate 30. AND gate 30 provides an output to ON/OFF switch 20 only when signals are received, thereby indicating that relays 27 and 28 are both closed. Thus, only when this condition exists, can power be fed through switch 20 to actuate power relay (contactor) 17 to energize the system. In this manner, damage to components is avoided either through inadvertent reversal of the polarity of the DC power source or in the absence of the 12-volt control power from DC-DC converter 14.

Referring now to FIG. 2, a preferred embodiment of the DC controller of the system is illustrated. The controller comprises an off-the-shelf integated PWM circuit such as the type LM3524 unit manufactured by National Semiconductor Corporation, or other suitable equivalent unit. This type of semiconductor pulse width modulator requires 12 volts for its operation, which is provided by DC-DC converter 14. The pulse width of the output 41 of the pulse width modulator is controlled by means of control potentiometer 43. Thus, a rectangular wave output 41 is provided from regulating pulse width modulator 40, the positive going portions of which have a width which is in accordance with the setting of the potentiometer 43. The rectangular waves 41 are fed to voltage amplifier 43 where the signals are amplified and fed as the control input to output drivers 47.

Voltage amplifier 43 may comprise a voltage amplifying transistor while output drivers 47 may comprise suitable power transistors which are driven into the conductive state only during the positive going period of wave form 41. Thus, the average current conducted through output drivers 47 is a direct function of the width of the positive going portions of wave form 41.

The positive output of the power source, as at point "B" in FIG. 2, is fed to one of the terminals of the controlled lamps 18, while the negative terminal of the power source (point "C" of FIG. 1) is fed to an output of output drivers 47. Thus, the output drivers are connected in series with the negative output of the power supply and the controlled lamps 18, such that the drivers effectively operate as a variable impedance device to control the current fed to the lamps in accordance with the output of the pulse width modulator 40. The use of a pulse width modulator to control the current fed to a load is described in U.S. Pat. No. 3,305,767 to Beihl et al.

A relatively small value current sensing potentiometer 49 is placed in series between output drivers 47 and the controlled lamps 18, the value of this resistance being small enough so that minimum power is dissipated thereby. Typically, the value of potentiometer 49 is of the order of 0.001 ohms. The arm of potentiometer 49 is fed to the comparator pin of the pulse width modulator (pin 9 of the LM3524) and provides a reference voltage for the pulse width modulator which sets an upper limit for the width of the pulses generated thereby, thereby limiting the output current. This, in effect, overrides the input provided from control potentiometer 43 to prevent a pulse width output in excess of any predetermined value. Thus, for example, potentiometer 49 can be set to limit the current provided to controlled lamps 18 to 100 amperes by setting this potentiometer at a point whereat it is impossible to exceed an output of 100 amperes with any setting of control potentiometer 43.

While the invention has been described and illustrated in detail, it is to be clearly understood that this is intended by way of illustration and example only and is not to be taken by way of limitation, the spirit and scope of the invention being limited only by the terms of the following claims.

I claim:

1. A light dimmer control system for controlling the current supplied from a DC power source to a high power illuminating lamp comprising DC-DC converter means connected to said DC power source for generating a DC voltage substantially lower than that of said power source, DC controller means including a manually operable control, the controller means being connected in the current path between the lamp and the DC power source for controlling the current supplied to the lamp in response to said manually operable control, said DC controller means receiving its operating power from the DC-DC converter, and logical control circuit means responsive to the outputs of said power source and said DC-DC converter for preventing the connection of said DC power source to the controller means and lamp except when both the polarity of the output of the DC power source is correct and the output of the DC-DC converter is present.

2. The light dimmer control system of claim 1 wherein said DC controller means comprises a semiconductor pulse width modulator circuit, the manually operable control comprising a potentiometer for varying the pulse width of the pulse width modulator output.

3. The light dimmer control system of claim 2 wherein the DC controller means further includes semiconductor output driver means responsive to the pulse width modulator output, said output driver means being connected in the current path between the lamp and DC power source.

4. The light dimmer control system of claim 2 or 3 and further including current sensor means for providing an electrical signal in accordance with the current being supplied to the lamp, said electrical signal being fed to the pulse width modulator to limit the output thereof to a predetermined maximum pulse width, thereby limiting the current being supplied to the lamp accordingly.

5. The light dimmer control system of claim 1 wherein the logical control circuit means comprises a polarity sensitive relay connected to the DC power source, a relay responsively connected to the output of the DC-DC converter, an AND gate connected to receive the outputs of both of said relays, said AND gate providing an output control signal only when there are outputs present from both of said relays, and power relay means responsive to said control signal for connecting the power from the DC power source to the lamp.

* * * * *